United States Patent
Coulter et al.

(10) Patent No.: US 7,069,402 B2
(45) Date of Patent: Jun. 27, 2006

(54) HOST-INDEPENDENT INCREMENTAL BACKUP METHOD, APPARATUS, AND SYSTEM

(75) Inventors: Robert Clyde Coulter, Longmont, CO (US); Brian Dennis McKean, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 10/452,469

(22) Filed: Jun. 2, 2003

(65) Prior Publication Data

US 2004/0243775 A1 Dec. 2, 2004

(51) Int. Cl.
*G06F 12/00* (2006.01)

(52) U.S. Cl. ........................ 711/162; 711/161; 711/154; 707/204; 714/6

(58) Field of Classification Search ............... None
See application file for complete search history.

(56) References Cited

U.S. PATENT DOCUMENTS

| | | | |
|---|---|---|---|
| 5,163,148 A | 11/1992 | Walls ...................... 395/600 |
| 5,241,668 A | 8/1993 | Eastridge et al. ........... 395/575 |
| 5,241,669 A | 8/1993 | Cohn et al. ................ 395/575 |
| 5,241,670 A | 8/1993 | Eastridge et al. ........... 395/575 |
| 5,263,154 A | 11/1993 | Eastridge et al. ........... 395/575 |
| 5,337,275 A | 8/1994 | Garner .................. 365/189.01 |
| 5,357,475 A | 10/1994 | Hasbun et al. .............. 365/218 |
| 5,375,232 A | 12/1994 | Legvold et al. ............ 395/575 |
| 5,379,398 A | 1/1995 | Cohn et al. ................ 395/425 |
| 5,379,412 A | 1/1995 | Eastridge et al. ........... 395/575 |
| 5,455,944 A | 10/1995 | Haderle et al. ............. 395/600 |
| 5,457,658 A | 10/1995 | Niijima et al. .............. 365/218 |
| 5,471,604 A | 11/1995 | Hasbun et al. .............. 395/404 |
| 5,495,607 A | 2/1996 | Pisello et al. ............... 395/600 |
| 5,561,786 A | 10/1996 | Morse ................... 395/497.01 |
| 5,581,723 A | 12/1996 | Hasbun et al. .............. 395/430 |
| 5,678,042 A | 10/1997 | Pisello et al. ............... 395/610 |
| 5,740,395 A | 4/1998 | Wells et al. ................ 395/430 |
| 5,813,042 A | 9/1998 | Campbell et al. ........... 711/159 |
| 5,822,781 A | 10/1998 | Wells et al. ................ 711/171 |
| 5,835,953 A | 11/1998 | Ohran ....................... 711/162 |
| 5,875,479 A | 2/1999 | Blount et al. .............. 711/162 |
| 5,930,815 A | 7/1999 | Estakhri et al. ............. 711/103 |
| 5,933,834 A | 8/1999 | Aichelen ................... 707/103 |
| 5,933,845 A | 8/1999 | Kopp et al. ................ 711/103 |
| 6,023,744 A | 2/2000 | Shoroff et al. ................ 711/4 |
| 6,038,636 A | 3/2000 | Brown, III et al. ......... 711/103 |
| 6,073,222 A | 6/2000 | Ohran ....................... 711/162 |
| 6,076,148 A | 6/2000 | Kedem ...................... 711/162 |
| 6,085,298 A | 7/2000 | Ohran ....................... 711/162 |
| 6,101,585 A | 8/2000 | Brown et al. .............. 711/162 |
| 6,128,630 A | 10/2000 | Shackelford ................ 707/204 |
| 6,145,051 A | 11/2000 | Estakhri et al. ............. 711/103 |
| RE37,038 E | 1/2001 | Eastridge et al. .............. 714/5 |
| 6,223,308 B1 | 4/2001 | Estakhri et al. .............. 714/42 |
| 6,247,024 B1 | 6/2001 | Kincaid ..................... 707/204 |

(Continued)

*Primary Examiner*—Gary Portka
*Assistant Examiner*—Jasmine Song
(74) *Attorney, Agent, or Firm*—Kunzler & Associates (57) ABSTRACT

Block-level operations are tracked within a storage subsystem. Metadata corresponding to the block-level operations are collected within the storage subsystem between snapshot (i.e., backup) instances. The collected metadata are referenced to ensure that only overwritten data blocks are copied to the backup device. The present invention leverages the capabilities of flashcopy operations, frees the host from costly housekeeping tasks, and facilitates efficient backup operations independent of a host or filesystem.

22 Claims, 4 Drawing Sheets

U.S. PATENT DOCUMENTS

| | | | |
|---|---|---|---|
| 6,256,642 B1 | 7/2001 | Krueger et al. | 707/205 |
| RE37,364 E | 9/2001 | Cohn et al. | 714/6 |
| 6,324,631 B1 | 11/2001 | Kuiper | 711/170 |
| 6,329,985 B1 | 12/2001 | Tamer et al. | 345/356 |
| 6,748,504 B1 * | 6/2004 | Sawdon et al. | 711/162 |
| 6,792,518 B1 | 9/2004 | Armangau et al. | 711/162 |
| 6,799,189 B1 * | 9/2004 | Huxoll | 707/204 |
| 6,829,617 B1 * | 12/2004 | Sawdon et al. | 707/102 |

* cited by examiner

HOST-INDEPENDENT INCREMENTAL BACKUP METHOD, APPARATUS, AND SYSTEM

RELATED APPLICATIONS

Ser. No. 10/409,269, John A. Hulsey inventor, entitled METHOD, SYSTEM, AND APPARATUS FOR RELEASING STORAGE IN A FAST REPLICATION ENVIRONMENT filed on Apr. 8, 2003.

BACKGROUND OF THE INVENTION

1. The Field of the Invention

The invention relates to methods, apparatus, and systems for archiving data. Specifically, the invention relates to methods, apparatus, and systems for conducting incremental backups of data within a storage subsystem, independent of a host or file system.

2. The Relevant Art

Data processing systems are often required to copy large amounts of data to secondary storage or to another primary data store. Historically, copying entire volumes of data required that a system suspend all tasks that might access a source and/or a target volume. Suspension of the various tasks or processes to conduct the copy operation greatly reduced the performance of such systems.

Incremental backup techniques have been developed to lessen stoppage time and to increase system performance when archiving data. Incremental backup methods are typically conducted by software residing on the host, which monitors or detects storage volume changes at a file level. For example, an incremental backup process running on the host system may be required to scan all of the files within the file system in order to ascertain which blocks of data on the storage subsystem have changed since the last backup. To perform an incremental backup, any files that have been modified since the last backup are copied to a backup device such as a tape drive during a snapshot session.

Another method to reduce stoppage time while copying data from one volume to another is referred to as an instant copy, or "flashcopy." An instant copy or flashcopy replicates data in a manner that appears instantaneous and allows a host to continue accessing a volume while actual data transfers are deferred to a later time. Flashcopy techniques typically defer the transfer of a data block to the secondary volume until a write operation is requested to that particular block on the primary volume. Until the actual data transfer occurs, read operations to the secondary volume are redirected to the primary volume. Flashcopy techniques greatly increase the performance of data processing systems and are conducted by the storage subsystem in a manner that is transparent to the host or file system.

In addition to increased performance, flashcopy capable systems simplify the code complexity of I/O intensive processes such as those conducted on large mainframe systems and the like. While extremely useful, conducting flashcopy operations directly to a backup device is not desirable in that the actual data is not immediately transferred to the backup device, thus leaving the system more vulnerable to various failures.

Despite the progress in backup systems, a need exists for a method of performing an incremental backup without requiring knowledge of files and access to the file system. Such a method would relieve the burden on the host computer of tracking and bookkeeping tasks and would facilitate efficient use of the backup resources while enabling access to the data involved in backup operations. In particular, what is needed is a method to leverage the capabilities of flashcopy techniques when performing incremental backups of data residing on storage subsystems.

BRIEF SUMMARY OF THE INVENTION

The methods of the present invention have been developed in response to the present state of the art, and in particular, in response to the problems and needs in the art that have not yet been fully solved by currently available incremental backup methods. Accordingly, the present invention provides an improved method, apparatus, and system for conducting incremental backups of data stores.

In one aspect of the invention, a method for conducting block-level incremental backups in a host-independent manner within a storage subsystem includes tracking block-level operations within the storage subsystem, and receiving an instantaneous replication (hereinafter referred to as "snapshot") command at a first time instance. A second snapshot command is received at a second time instance, whereupon data corresponding to blocks overwritten between the first and second time instance are transferred or copied to a backup device or system.

In one embodiment, tracking block-level operations is conducted by one or more storage controllers associated with a storage subsystem in a manner which frees the host from housekeeping tasks. To facilitate conducting incremental backups, metadata describing the block-level operations is stored in a buffer and referenced to ascertain which data blocks should be transferred to the backup device or subsystem.

With the initial snapshot command in a series of snapshot commands, a full backup is conducted and the entire volume is copied to the backup device. With each subsequent snapshot command, an incremental backup is conducted by copying those blocks that were overwritten since the previous snapshot command.

With the present invention, backup operations may be initiated from a host by sending a snapshot command to the storage subsystem. Alternately, backup operations may be initiated by a timer or other process running within the storage subsystem completely independent of the host.

In another aspect of the present invention, a storage controller for controlling storage devices and conducting block-level incremental backups is configured to execute the aforementioned methods. In one embodiment, the storage controller maintains internal information referred to as metadata, which describes which data blocks have moved from the primary volume to the secondary volume in response to data writes on the primary volume and also describes where the data resides on the secondary volume. In response to a snapshot command (other than the initial snapshot command), the storage controller initiates a transfer or copy operation of those blocks which have been written on the primary volume between the previous snapshot instance and the current snapshot instance.

In another aspect of the present invention, a system for archiving data in a host-independent manner includes at least one host configured to process data and request storage services, a plurality of storage devices, and at least one controller configured to execute the aforementioned methods.

In another aspect of the present invention, a storage area network for storing data includes a plurality of storage subsystems and a network configured to interconnect the plurality of storage subsystems. At least one storage subsystem of the plurality of storage subsystems includes at least one controller configured to execute the aforementioned methods.

The various aspects of the present invention increase the performance of conducting backup operations within data processing systems. The processing burden on the host is minimized, while accessibility to the data involved with backup operations is maintained. These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
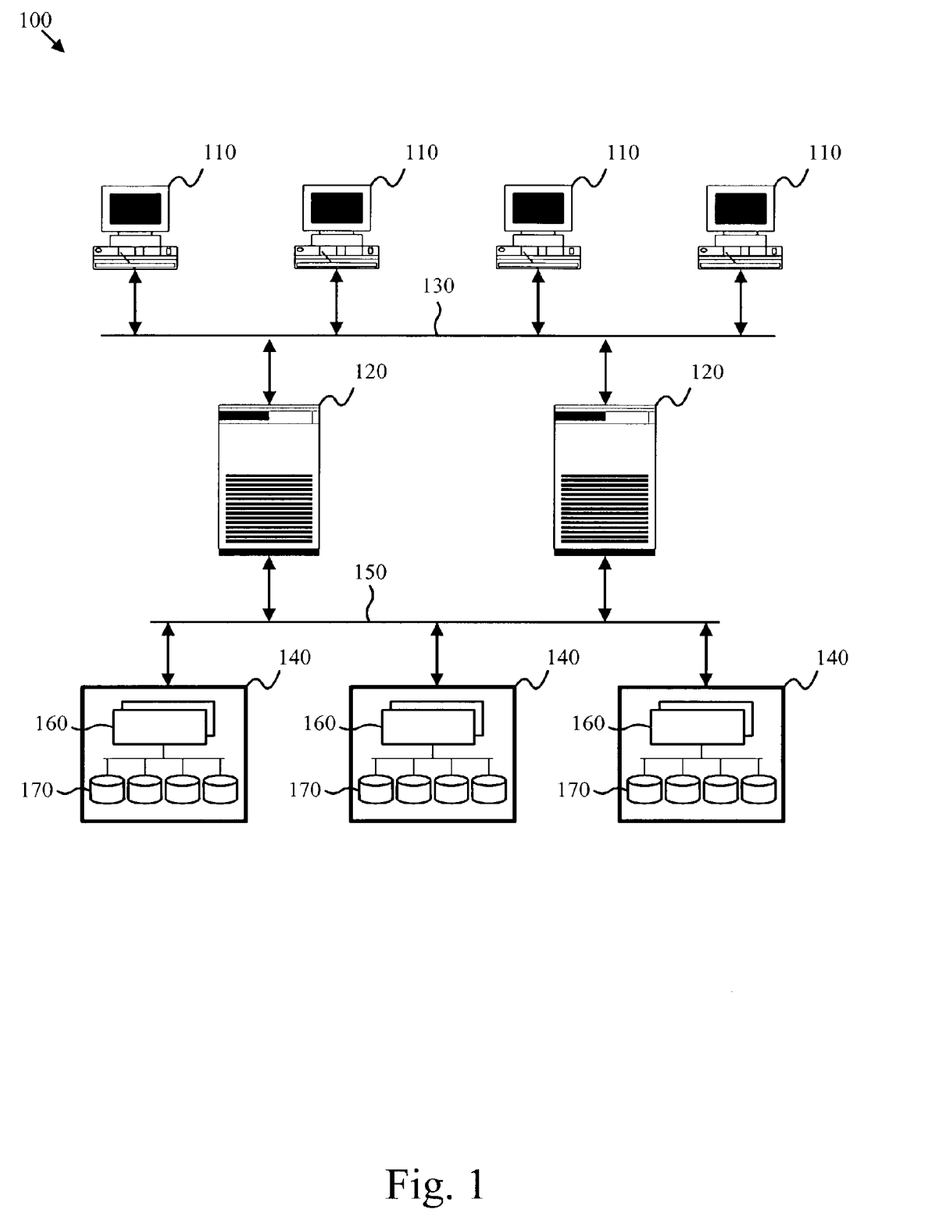
FIG. 1 is a schematic block diagram illustrating one embodiment of a network system representative of the environment wherein the present invention may be deployed.

Referring to FIG. 1, a network system 100 is representative of the environment wherein the present invention may be deployed. The depicted network system 100 includes workstations 110 and servers 120 interconnected via a network 130. The network 100 may comprise a local area network and/or a wide area network.

The depicted network system 100 also includes one or more storage subsystems 140 interconnected with the servers 120 via a storage network 150. In one embodiment, the servers 120 are mainframe computers configured to conduct high bandwidth I/O operations with the storage subsystems 140. The storage subsystems 140 are in one embodiment fault tolerant subsystems containing redundant storage controllers 160 and storage devices 170.

Figure 2A:
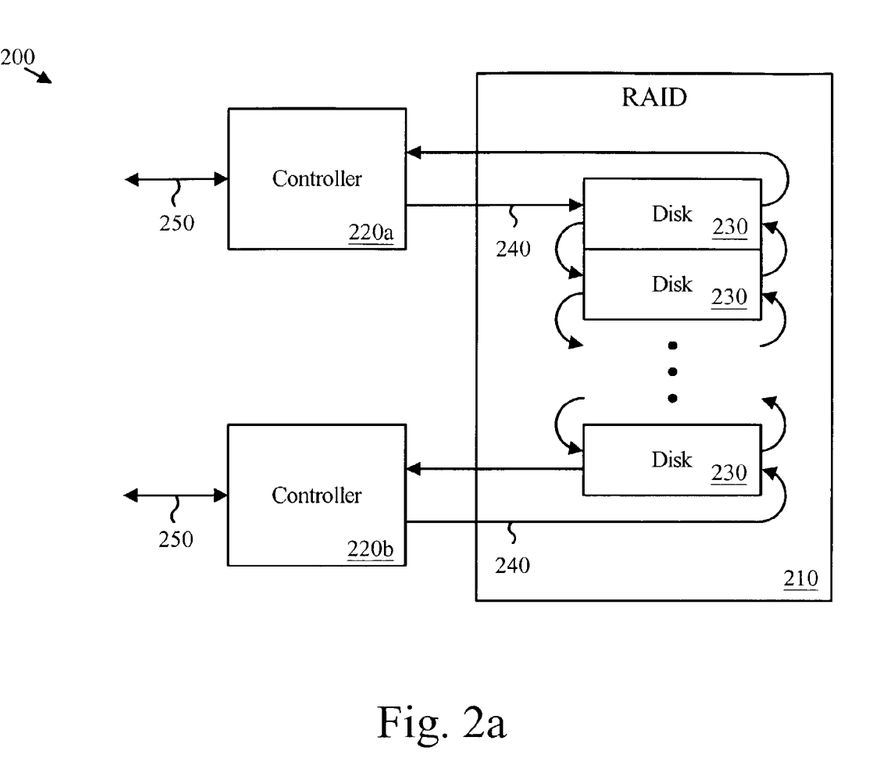
FIG. 2a is a schematic block diagram further illustrating a representative storage sub-system in accordance with the present invention.

FIG. 2a is a schematic block diagram of a storage sub-system 200 further illustrating an environment in which the present invention may be deployed. The storage sub-system 200 is a representative example of sub-systems in which the present invention may be deployed and is one example of the configuration of the storage subsystem 140 depicted in FIG. 1. The storage sub-system 200 includes a storage array 210 and one or more controllers 220. The storage sub-system 200 preferably includes a plurality of controllers 220 in order to achieve increased reliability through redundancy. The storage array 210 is also preferably made redundant by including a number of storage devices 230 interconnected with an array loop 240.

In the depicted embodiment, the storage devices 230 are interconnected with an array loop 240. The array loop 240 also interconnects the controllers 220 with the storage array 210. The array loop 240 circulates communications in both directions to increase reliability and throughput. In one embodiment, the array loops 240 are point-to-point loops such as those defined by the fibre channel standard.

In the depicted embodiment, the controllers 220 each support a host connection 250. The controllers 220 receive access requests via the host connection 250 and service those requests by transferring blocks of data to and from the storage array 210. The blocks of data that are transferred to the storage array 210 may be redundantly encoded to permit error detection and data recovery in the event of failure of one of the storage devices 230. Typically, the controllers 220 organize the storage devices 230 in a redundant manner and provide access to one or more volumes to a host.

In addition to connection and data redundancy, the controllers 220 in one embodiment support some type of an instantaneous replication or "flashcopy" operation. A flashcopy operation provides the appearance of an instant copy between a source volume and a target volume within a storage sub-system such as the storage sub-system 200. A flashcopy operation conducts data transfers from a source volume to the target volume at the convenience of the storage sub-system 200 without halting access to the source or target volumes by an external device, such as a host or server.

The challenge of conducting flashcopy operations and their associated background copy operations is in maintaining the integrity of the source and target volumes in light of on-going read, write, and delete operations to the source and target volumes. The aforementioned co-pending application of John A. Hulsey entitled METHOD FOR MANAGING FRESPACE WITH DATA SET LEVEL FLASHCOPY discloses methods and means for conducting flashcopy operations on a sub-volume basis that may be used in conjunction with the present invention to increase the usefulness thereof. As such, the aforementioned application is hereby incorporated by reference into this document. Data integrity is maintained during flashcopy operations by tracking changes that occur to the source volume. A need currently exists for a method to leverage the tracking features of flashcopy operations in order to conduct incremental backup operations in an efficient, host-independent manner.

Figure 2B:
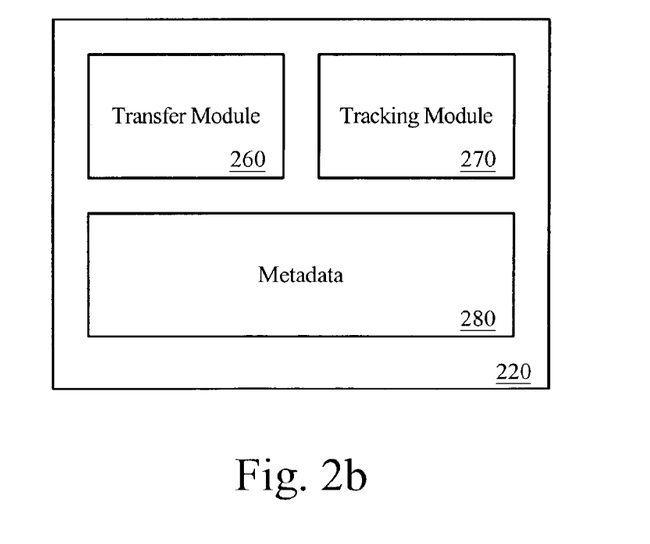
FIG. 2b is a block diagram illustrating selected modules of one embodiment of a backup capable controller of the present invention.

Referring to FIG. 2b, a backup capable controller 220 of the present invention facilitates conducting incremental backup operations from a source volume to a target device in a host-independent manner. The controller 220 in the depicted embodiment includes a transfer module 260 that enables the transfer of data between devices, a tracking module 270 that tracks the movement and placement of the data on a block level, and a metadata buffer 280 for collecting metadata describing block-level operations. In one embodiment, the modules of the controller 220 are software modules programmed to conduct their designated tasks.

The transfer module 260 coordinates data transfers between source and target volumes. In one embodiment, the transfer module 260 conducts handshaking with the storage devices 230 in a manner that validates the reliability of data transfers. The tracking module 270 tracks the movement and placement of data involved in flashcopy and backup operations. In one embodiment, the tracking module 270 uses bit flags to mark and unmark regions containing data involved with flashcopy or backup operations.

A metadata buffer 280 contains metadata describing block-level operations related to block-level data involved with flashcopy and/or backup operations. In one embodiment, the metadata includes a block index and an operation code indicating the type of operation associated with the block. In one embodiment, the data within the metadata buffer is a variable-sized log of changes to specified data blocks such as those associated with a volume designated for backup. In another embodiment, the metadata buffer is a fixed-sized table indicating the status of each data block that is tracked.

Figure 3:
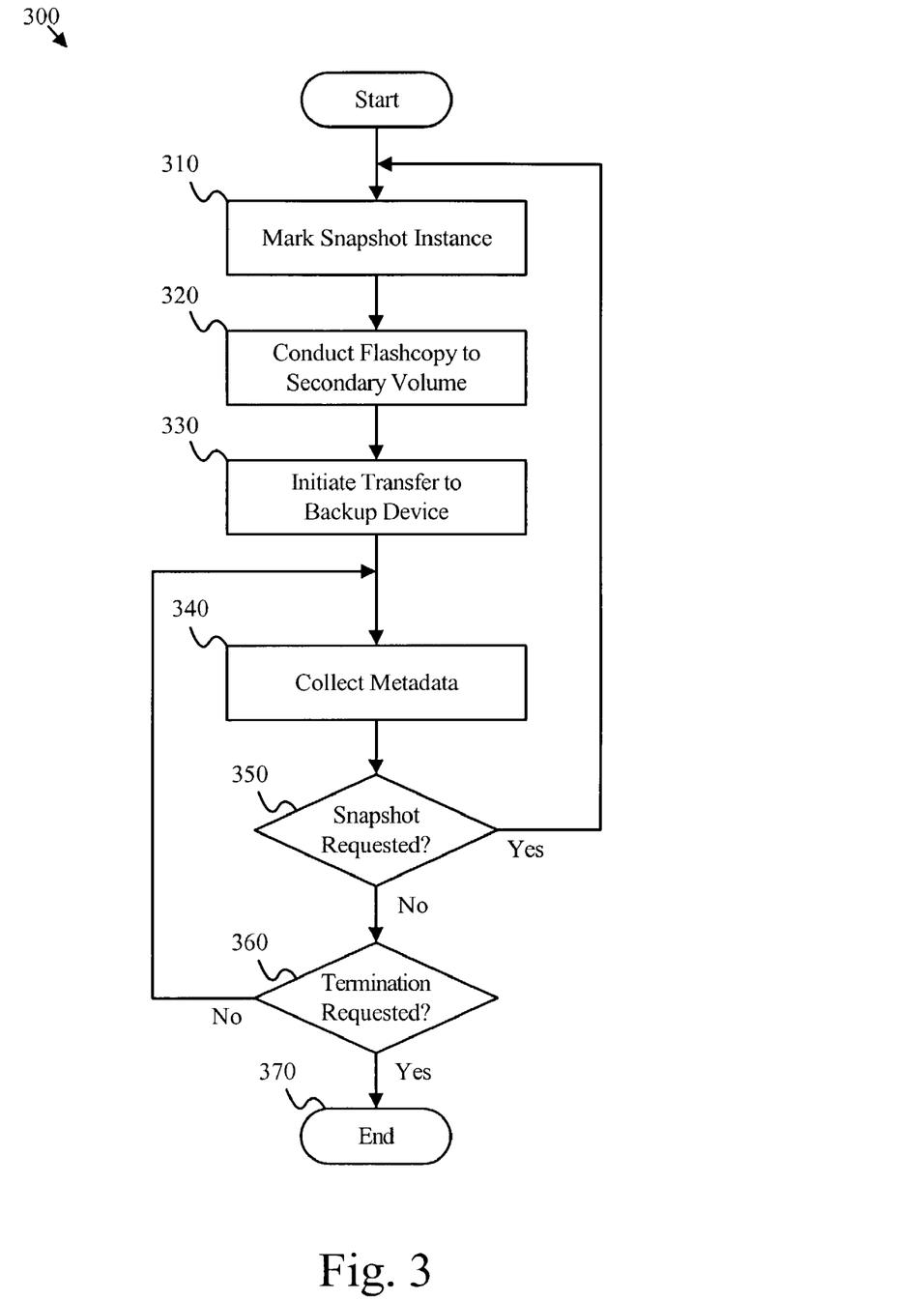
FIG. 3 is a flow chart illustrating one embodiment of a host-independent incremental backup method of the present invention.

FIG. 3 is a flow chart illustrating one embodiment of a host-independent incremental backup method 300 of the present invention. The backup method 300 facilitates efficient incremental block-level backups of data within a storage subsystem without requiring bookkeeping operations within the host or filesystem that keep track of read, write, and delete operations. Although the backup method 300 may be conducted on a sub-volume level, for clarity purposes the description of the backup method 300 generally assumes block-level backup of an entire volume.

As depicted, the backup method 300 includes a mark snapshot instance step 310, a conduct flashcopy step 320, an initiate background transfer step 330, a collect metadata step 340, a snapshot requested test 350, and a termination requested test 360. Although for purposes of clarity the steps of the backup method 300 are depicted in a certain sequential order, execution within an actual system may be conducted in parallel and not necessarily in the depicted order.

The backup method 300 is typically invoked in conjunction with conducting a baseline backup and typically loops through once for the initial or baseline backup and once for each subsequent (i.e. incremental) backup. Alternately, the backup method 300 may be partitioned into separate routines for initial (full) backups and subsequent (incremental) backups. Preferably, any data caches on the host or elsewhere are flushed previous to invoking the backup method 300 to ensure the integrity of the file system.

The mark snapshot instance step 310 marks the instance of the backup for purposes of restoration. In one embodiment, marking the snapshot instance involves saving a timestamp indicating the time of the backup along with additional data indicating the volume (or portion thereof) involved in the backup. In certain embodiments, marking the snapshot instance may also involve saving a pointer that marks the current insertion position of the metadata buffer 280.

The depicted backup method 300 proceeds from the mark snapshot instance step 310 to the conduct flashcopy step 320. The flashcopy step 320 conducts an instant copy from a primary volume (or a portion thereof) to a secondary volume. Rather than conducting actual data transfers between the primary and secondary volume, the conduct flashcopy step 320 preferably initiates tracking of operations that effect the primary volume. Access to the secondary volume (i.e. the flashcopy target) is redirected to the primary volume. In the event of a write operation to the primary volume, for example by a host, the original data from the primary volume is transferred to the secondary volume to preserve the original data and thereby maintain the integrity of the secondary volume.

Using an actual flashcopy command to implement step 320 is not required but may be a convenient method to track changes to the original data and facilitates using a common code base for flashcopy and backup operations.

The initiate transfer step 330 initiates the transfer of data from the secondary volume to the backup device or subsystem. In one embodiment, the transfers are conducted as a background task. With an initial backup, the entire secondary volume is transferred to the backup device. With each subsequent backup, only those blocks that have changed on the primary volume since the previous backup operation are transferred to the backup device.

The collect metadata step 340 collects metadata describing operations that change the primary volume so that the subsequent backups can use the metadata to determine which data blocks should be transferred to the backup device. In certain embodiments, the metadata corresponds to data used to track changes related to flashcopy operations. In those embodiments, the collect metadata step may occur automatically in conjunction with the conduct flashcopy step 320 and need not be done separately.

The snapshot requested test 350 ascertains whether a snapshot command related to the primary volume (or portion thereof) has been issued. If so, the backup method 300 loops to the mark snapshot instance step 310, otherwise the method proceeds to the termination requested test 360. The termination requested test 360 ascertains whether termination of the specific backups related to the primary volume (or portion thereof) has been requested, for example, by the host. If so, the backup method 300 ends 370. Otherwise the method loops to the collect metadata step 340 and continues operation.

Essentially, the backup method 300 conducts a virtual instant copy (i.e. a flashcopy) operation to a secondary volume in order to continue access to the primary volume and effectively freeze the volume contents on the secondary volume while data is transferred from the secondary volume to the backup device. Actual access to the secondary volume is is redirected to the primary volume except for data that has been transferred to the secondary volume in response to write operations on the primary volume. With the initial snapshot, the entire contents of the (frozen) secondary volume is written to the backup device or subsystem. With subsequent snapshots, only data blocks that have changed on the primary volume between the previous snapshot instance and the current snapshot instance are written to the backup device or subsystem.

Figure 4:
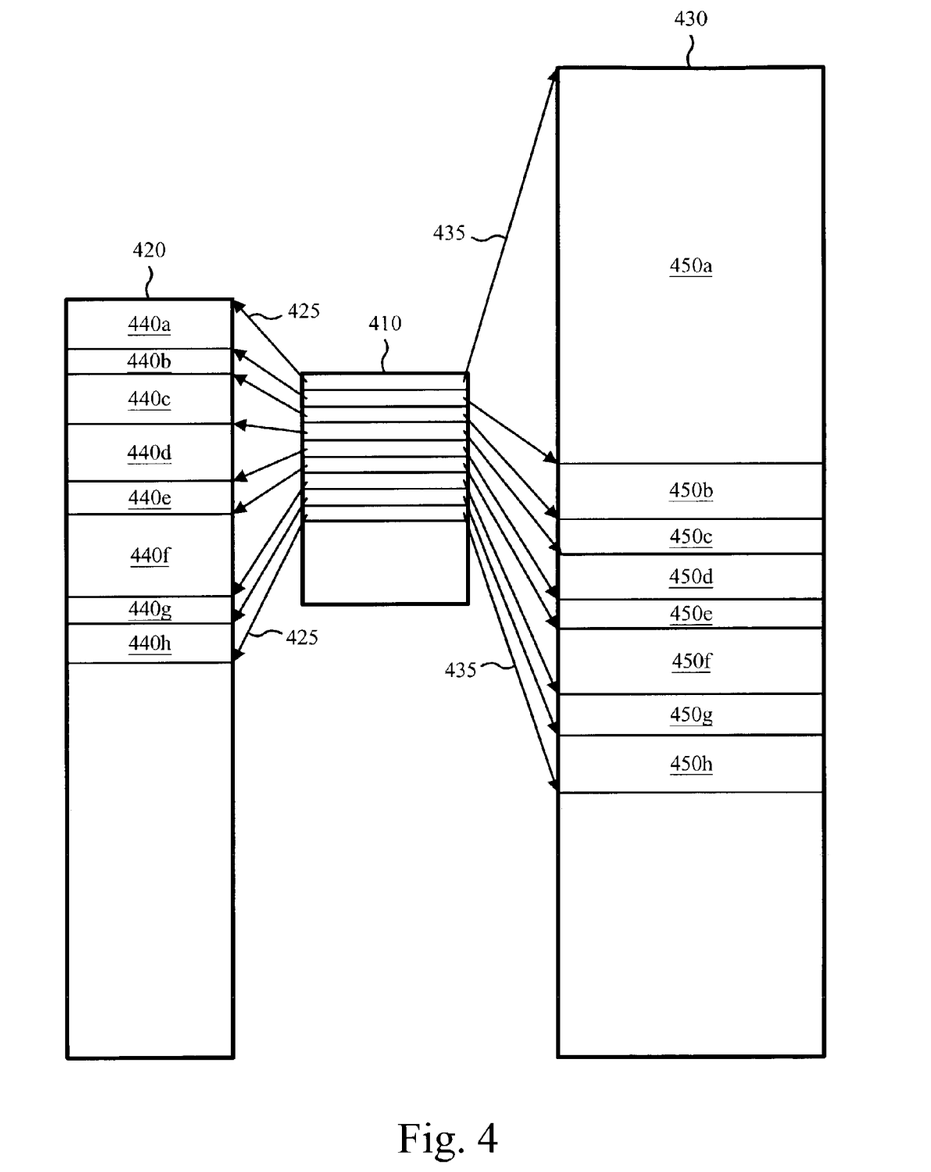
FIG. 4 is a block diagram illustrating representative results of the method of FIG. 3.

FIG. 4 is a block diagram illustrating the results of one embodiment of the method of FIG. 3. The diagram features an instance table 410, a metadata buffer 420, and a backup image 430. The depicted data structures illustrate one example of the results of one embodiment of the backup method 300. The depicted structures data contained therein may be used to restore the primary volume (or portion thereof) to a specific image corresponding to a specific snapshot instance.

The depicted instance table 410 contains a timestamp indicating the time of the backup, a pointer 425 that marks the current insertion position of the metadata buffer, a pointer 435 that marks the current insertion position on the backup device, and additional data indicating the volume (or portion thereof) involved in the backup. The depicted metadata buffer 420 contains metadata describing operations that changed blocks between snapshot instances.

The pointers 425 from the depicted instance table 410 partition the depicted metadata buffer 420 into metadata intervals 440a to 440h. The depicted backup image 430 is also partitioned into regions 450a to 450h corresponding to the metadata intervals 440a to 440h. The pointers 435 point to specific regions 450 of the backup image 430 and facilitate recovery of the primary volume to a specific snapshot instance. Although the regions 450 are shown in contiguous sequential order, they need not be in contiguous sequential order on the actual backup device.

Preferably, the backup image 430 contains the information contained within the instance table 410 and the metadata buffer 420 or similar information, in order to facilitate restoration solely from the backup image 430. For example, in certain embodiments the regions 450 are prefaced with the specific entry from the instance table 410 that corresponds to the particular region 450 along with the metadata from the corresponding metadata interval 440.

The present invention increases the efficiency of conducting backup operations and off-loads such operations from the host. In particular, bookkeeping by the file system or backup manager to track those files that have changed since a previous backup need not occur. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A storage controller for controlling storage devices and conducting block-level incremental backups within a storage subsystem in a host-independent manner, the storage controller configured to:
   track block-level write operations on a storage volume without communicating with a host that manages the storage controller;
   collect metadata describing the block-level write operations;
   receive a first snapshot command at a first time instance;
   receive a second snapshot command at a second time instance, the first snapshot command and the second snapshot command each referencing the storage volume as the source volume for the snapshot command; and
   transfer data corresponding to blocks overwritten on the storage volume between the first time instance and the second time instance to a backup device based on the metadata.

2. The storage controller of claim 1, wherein the metadata is stored within the storage subsystem.

3. The storage controller of claim 1, further configured to store the metadata on the backup device.

4. The storage controller of claim 1, further configured to track block-level write operations by initiating a flashcopy command.

5. The storage controller of claim 1, wherein the first snapshot command corresponds to a baseline backup.

6. The storage controller of claim 1, wherein the second snapshot command corresponds to an incremental backup.

7. The storage controller of claim 1, wherein the first and second snapshot commands are received from the host.

8. The storage controller of claim 1, wherein the first and second snapshot commands are scheduled events.

9. The storage controller of claim 1, wherein the backup device is comprises one of a tape device, a magnetic device, an optical device, a solid state device, a tape library, and a second storage subsystem.

10. A storage subsystem for storing data and conducting block-level incremental backups in a host-independent manner, the storage subsystem comprising:
    a plurality of storage devices; and
    at least one controller configured to track block-level write operations on a storage volume without communicating with a host that manages the at least one controller, collect metadata describing the block-level write operations, receive a first snapshot command at a first time instance, receive a second snapshot command at a second time instance, the first snapshot command and the second snapshot command each referencing the storage volume as the source volume for the snapshot command, and transfer data corresponding to blocks overwritten on the storage volume between the first time instance and the second time instance to a backup device based on the metadata.

11. A system for archiving data in a host-independent manner, the system comprising:
    at least one host configured to process data and request storage services;
    a plurality of storage devices; and
    at least one controller configured to track block-level write operations on a storage volume without communicating with the at least one host that manages the at least one controller, collect metadata describing the block-level write operations, receive a first snapshot command at a first time instance, receive a second snapshot command at a second time instance, the first snapshot command and the second snapshot command each referencing the storage volume as the source volume for the snapshot command and transfer data corresponding to blocks overwritten on the storage volume between the first time instance and the second time instance to a backup device based on the metadata.

12. A storage area network for storing data, the storage area network comprising:
  a plurality of storage subsystems;
  a network configured to interconnect the plurality of storage subsystems; and
  at least one storage subsystem of the plurality of storage subsystems comprising at least one controller configured to track block-level write operations on a storage volume without communicating with a host that manages the at least one storage subsystem, collect metadata describing the block-level write operations, receive a first snapshot command at a first time instance, receive a second snapshot command at a second time instance, the first snapshot command and the second snapshot command each referencing the storage volume as the source volume for the snapshot command, and transfer data corresponding to blocks overwritten on the storage volume between the first time instance and the second time instance to a backup device based on the metadata.

13. A computer readable storage medium comprising computer readable program code for conducting incremental snapshots within a storage subsystem in a host-independant manner, the program code configured to:
  track block-level write operations on a storage volume without communicating with a host configured to manage the storage volume;
  collect metadata describing the block-level write operations;
  receive a second snapshot command at a first time instance;
  receive a second snapshot command at a first time instance the first snapshot command and the second snapshot command each referencing the storage volume as the source volume for the snapshot command; and
  transfer data corresponding to blocks overwritten on the storage volume between the first time instance and the second time instance to a backup device based on the metadata.

14. An apparatus for conducting block-level incremental backups in a host-independent manner within a storage subsystem, the method comprising:
  means for tracking block-level write operations on a storage volume without communicating with a host configured to manage the storage subsystem;
  means for collecting metadata describing the block-level write operations;
  means for receiving a first snapshot command at a first time instance;
  means for receiving a second snapshot command at a second time instance the first snapshot command and the second snapshot command each referencing the storaae volume as the source volume for the snapshot command; and
  means for transferring data corresponding to blocks overwritten on the storage volume between the first and second time instance to a backup device based on the metadata.

15. A method for conducting block-level incremental backups in a host-independent manner within a storage subsystem, the method comprising:
  tracking block-level write operations on a storage volume without communicating with a host confirmed to manage the storage subsystem;
  collecting metadata describing the block-level write operations;
  receiving a first snapshot command at a first time instance;
  receiving a second snapshot command at a second time instance, the first snapshot command and the second snapshot command each referencing the storage volume as the source volume for the snapshot command; and
  transferring data corresponding to blocks overwritten on the storage volume between the first and second time instance to a backup device based on the metadata.

16. The method of claim 15, wherein the metadata is stored within the storage subsystem.

17. The method of claim 15, wherein tracking block-level write operations is initiated with a flashcopy command.

18. The method of claim 15, wherein the first snapshot command corresponds to a baseline backup.

19. The method of claim 15, wherein the second snapshot command corresponds to an incremental backup.

20. The method of claim 15, wherein the first and second snapshot commands are received from the host.

21. The method of claim 15, wherein the first and second snapshot commands are scheduled events conducted within the storage subsystem.

22. The method of claim 15, wherein the backup device comprises one of a tape device, a magnetic device, an optical device, a solid state device, a tape library, and a second storage subsystem.

* * * * *

UNITED STATES PATENT AND TRADEMARK OFFICE
CERTIFICATE OF CORRECTION

| | | |
|---|---|---|
| PATENT NO. | : 7,069,402 B2 | Page 1 of 1 |
| APPLICATION NO. | : 10/452469 | |
| DATED | : June 27, 2006 | |
| INVENTOR(S) | : Robert Clyde Coulter and Brian Dennis | |

It is certified that error appears in the above-identified patent and that said Letters Patent is hereby corrected as shown below:

Column 10 line 6 reads "storaae"

Should read --storage--

Signed and Sealed this

Twelfth Day of September, 2006

JON W. DUDAS
*Director of the United States Patent and Trademark Office*